United States Patent
Muthuramalingam et al.

(10) Patent No.: US 9,279,340 B2
(45) Date of Patent: Mar. 8, 2016

(54) SYSTEM AND METHOD FOR COOLING GAS TURBINE COMPONENTS

(71) Applicant: General Electric Company, Schenectady, NY (US)

(72) Inventors: Mahendhra Muthuramalingam, Chennai (IN); Ashok Kumar Anand, Niskayuna, NY (US); Veerappan Muthaiah, Bangalore (IN)

(73) Assignee: General Electric Company, Schenectady, NY (US)

( * ) Notice: Subject to any disclaimer, the term of this patent is extended or adjusted under 35 U.S.C. 154(b) by 443 days.

(21) Appl. No.: 13/890,332

(22) Filed: May 9, 2013

(65) Prior Publication Data
US 2013/0251509 A1 Sep. 26, 2013

Related U.S. Application Data

(63) Continuation-in-part of application No. 12/729,745, filed on Mar. 23, 2010, now abandoned.

(51) Int. Cl.
*F01D 25/12* (2006.01)
*F02C 7/18* (2006.01)

(52) U.S. Cl.
CPC .. *F01D 25/12* (2013.01); *F02C 7/18* (2013.01)

(58) Field of Classification Search
CPC ............ F01D 9/065; F01D 25/16; F02C 3/34
See application file for complete search history.

(56) References Cited

U.S. PATENT DOCUMENTS

| | | | |
|---|---|---|---|
| 4,190,398 A | 2/1980 | Corsmier et al. |
| 5,428,950 A | 7/1995 | Tomlinson et al. |
| 5,577,377 A | 11/1996 | Tomlinson |
| 5,611,197 A | 3/1997 | Bunker |
| 5,613,356 A | 3/1997 | Frutshi |
| 5,724,805 A | 3/1998 | Golomb et al. |
| 5,865,598 A | 2/1999 | Twerdochlib |
| 5,960,249 A | 9/1999 | Ritter et al. |
| RE36,497 E | 1/2000 | Tomlinson |
| 6,066,824 A | 5/2000 | Crawford et al. |
| 6,197,424 B1 | 3/2001 | Morrison et al. |
| 6,253,554 B1 | 7/2001 | Kobayashi et al. |
| 6,295,803 B1 | 10/2001 | Banclari |
| 6,339,926 B1 | 1/2002 | Ichiro et al. |

(Continued)

FOREIGN PATENT DOCUMENTS

| | | |
|---|---|---|
| EP | 0709885 A2 | 5/1996 |
| EP | 0990800 A1 | 4/2000 |
| GB | 2433581 A | 6/2007 |

*Primary Examiner* — Craig Kim
(74) *Attorney, Agent, or Firm* — Sutherland Asbill & Brennan LLP

(57) ABSTRACT

The present application provides a cooling system for a gas turbine. The cooling system may include a source of $CO_2$, a stator blade cooling system positioned about a casing of the gas turbine and in communication with the source of $CO_2$ and a number of stator blades, and a rotor blade cooling system positioned about a rotor shaft of the gas turbine and in communication with the source of $CO_2$ and a number of rotor blades. A first portion of a flow of $CO_2$ may flow through the stator blade cooling system and returns to the source of $CO_2$ in a first closed loop and a second portion of the flow of $CO_2$ may flow through the rotor blade cooling system and returns to the source of $CO_2$ in a second closed loop.

19 Claims, 6 Drawing Sheets

(56) References Cited

U.S. PATENT DOCUMENTS

| | | |
|---|---|---|
| 6,398,503 B1 | 6/2002 | Takahashi et al. |
| 6,487,863 B1 | 12/2002 | Chen et al. |
| 6,506,013 B1 | 1/2003 | Burdgick et al. |
| 6,672,075 B1 | 1/2004 | Sandu et al. |
| 6,684,653 B2 | 2/2004 | Des Champs et al. |
| 6,988,367 B2 | 1/2006 | Thompson Jr. et al. |
| 7,178,339 B2 | 2/2007 | Goldmeer et al. |
| 7,359,198 B2 | 4/2008 | Kelly et al. |
| 7,892,324 B2 | 2/2011 | Frydman et al. |
| 8,171,718 B2 | 5/2012 | Gulen et al. |
| 8,438,874 B2 * | 5/2013 | Koganezawa ............ C10L 3/10  60/805 |
| 2003/0094006 A1 | 5/2003 | Des Champs et al. |
| 2004/0224210 A1 | 11/2004 | Agnew |
| 2005/0223711 A1 | 10/2005 | Goldmeer et al. |
| 2006/0032228 A1 | 2/2006 | Marin et al. |
| 2007/0006592 A1 * | 1/2007 | Balan ........................ F02C 3/22  60/772 |
| 2007/0125063 A1 | 6/2007 | Evulat |
| 2007/0199300 A1 * | 8/2007 | MacAdam ............ F01K 17/025  60/39.52 |
| 2007/0234729 A1 * | 10/2007 | West ........................ F01D 25/12  60/772 |
| 2007/0242434 A1 | 10/2007 | Kelly et al. |
| 2007/0245749 A1 | 10/2007 | Atkins et al. |
| 2009/0149930 A1 | 6/2009 | Schenck |
| 2010/0018216 A1 | 1/2010 | Fassbender |
| 2010/0275644 A1 | 11/2010 | Koganezawa et al. |
| 2011/0020188 A1 | 1/2011 | Muthuramalingam et al. |
| 2011/0232298 A1 * | 9/2011 | Mahendra ............... F02C 7/18  60/783 |
| 2011/0260113 A1 | 10/2011 | Anand et al. |
| 2011/0277981 A1 | 11/2011 | Muthuramalingam et al. |
| 2011/0314819 A1 | 12/2011 | Muthuramalingam et al. |
| 2011/2011102 | 5/2012 | Anand et al. |
| 2012/0174621 A1 | 7/2012 | Raja et al. |
| 2013/0086883 A1 * | 4/2013 | Sander ...................... F02C 3/34  60/39.52 |
| 2013/0125555 A1 * | 5/2013 | Mittricker ................. F02C 9/50  60/772 |
| 2013/0229018 A1 * | 9/2013 | Karni ........................ F02C 3/20  290/1 R |
| 2014/0020359 A1 * | 1/2014 | Mimura .................. F01D 9/065  60/39.182 |
| 2014/0020402 A1 * | 1/2014 | Okamura ................ F01D 25/12  60/784 |
| 2014/0030073 A1 * | 1/2014 | Lacy ....................... F01D 25/12  415/177 |

* cited by examiner

US 9,279,340 B2

SYSTEM AND METHOD FOR COOLING GAS TURBINE COMPONENTS

RELATED APPLICATIONS

The present application is a continuation-in-part of U.S. Ser. No. 12/729,745, entitled "System and Method for Cooling Gas Turbine Components", filed on Mar. 23, 2010, now pending.

TECHNICAL FIELD

The subject matter disclosed herein relates to gas turbines and, more particularly, to cooling mechanisms in gas turbines.

BACKGROUND OF THE INVENTION

Integrated Gasification Combined Cycle (IGCC) systems are increasingly being utilized for power generation. IGCC systems use a gasification process to produce a synthesis gas (syngas) from fuel sources such as coal, heavy petroleum residues, biomass and others. The syngas is used as a fuel in gas turbines for producing electricity. IGCC systems can be advantageous in reducing carbon dioxide ($CO_2$) emissions through mechanisms such as pre-combustion carbon capture.

IGCC power plants adopt pre-combustion systems for $CO_2$ capture. Currently, the capture of $CO_2$ from IGCC plants penalizes the performance of such plants, particularly in production output and efficiency. In addition, cooling of the stationary and rotating components of a gas turbine by the conventional method of extracting air from the compressor reduces turbine efficiency by, for example, reducing the Brayton cycle efficiency. This loss of efficiency is manifested due to factors such as a reduction in firing temperatures due to non-chargeable flow diluting the combustor exit temperature, a reduction in work on account of bypassing compressed air at upstream stages of the turbine, and a reduction in work potential on account of dilution effects of the coolant stream mixing in the main gas path and the associated loss of aerodynamic efficiency.

SUMMARY OF THE INVENTION

The present application and the resultant patent thus provide a cooling system for a gas turbine. The cooling system may include a source of $CO_2$, a stator blade cooling system positioned about a casing of the gas turbine and in communication with the source of $CO_2$ and a number of stator blades, and a rotor blade cooling system positioned about a rotor shaft of the gas turbine and in communication with the source of $CO_2$ and a number of rotor blades. A first portion of a flow of $CO_2$ may flow through the stator blade cooling system and return to the source of $CO_2$ in a first closed loop and a second portion of the flow of $CO_2$ may flow through the rotor blade cooling system and return to the source of $CO_2$ in a second closed loop.

The present application and the resultant patent further provide a method of cooling a number of blades in a gas turbine. The method may include the steps of generating a flow of $CO_2$ in a cooling system, flowing a portion of the $CO_2$ through the blade so as to cool the blade and transfer heat to the flow of $CO_2$, flowing the heated $CO_2$ through a heat exchanger, and returning the portion of the flow of $CO_2$ to the cooling system.

The present application and the resultant patent further provide a cooling system for a gas turbine. The cooling system may include a source of $CO_2$, a stator blade cooling system positioned about a casing of the gas turbine and in communication with the source of $CO_2$ and a number of stator blades with an internal stator plenums, and a rotor blade cooling system positioned axially through a rotor shaft of the gas turbine and in communication with the source of $CO_2$ and a number of rotor blades with internal rotor plenums. A first portion of a flow of $CO_2$ flows through the stator blade cooling system and returns to the source of $CO_2$ in a first closed loop and a second portion of the flow of $CO_2$ flows through the rotor blade cooling system and returns to the source of $CO_2$ in a second closed loop.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the present application are apparent from the following detailed description taken in conjunction with the accompanying drawings in which:

DETAILED DESCRIPTION OF THE INVENTION

There is provided a system and method for improving the output and efficiency of turbine systems that utilize gasification to supply turbine combustion fuel. An exemplary turbine system includes integrated gasification combined cycle (IGCC) power generation systems. In one example, the systems and method are utilized in conjunction with IGCC or other turbine systems that incorporate pre-combustion systems for carbon dioxide ($CO_2$) capture. Exemplary systems and methods include cooling turbines using $CO_2$ captured by a power generation and/or $CO_2$ removal system. Exemplary systems and methods utilize captured $CO_2$ as cooling media for cooling of stationary and/or rotating components of turbines, such as gas turbines, in a closed loop cooling scheme.

Figure 1:
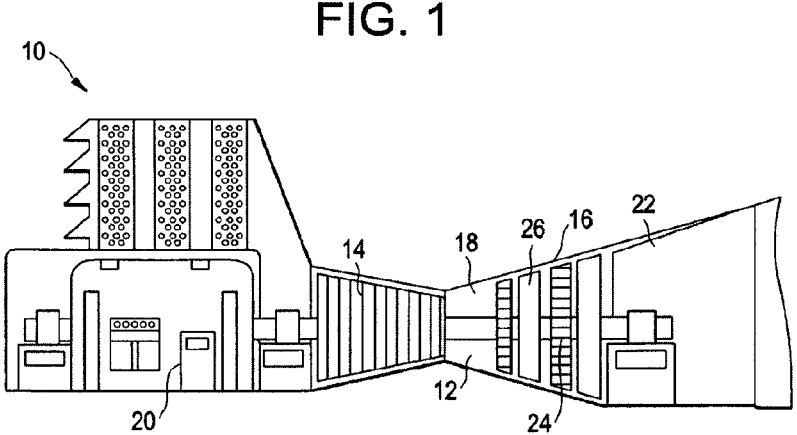
FIG. 1 is a cross-sectional view of an exemplary gas turbine.

With reference to FIG. 1, a gas turbine assembly is indicated generally at 10. The assembly 10 includes a rotor 12 attached to a compressor 14 and a power turbine 16. A combustion chamber 18 is in fluid communication with both the compressor 14 and the power turbine 16 and acts to ignite a fuel and air mixture to cause rotation of the power turbine 16 and the rotor 12. Rotation of the rotor 12 in turn powers, for example, a generator 20. An exhaust gas 22 is exhausted from the power turbine 16. In one example, at least a portion of the exhaust gas 22 is guided to a heat recovery steam generator (HRSG) that recovers heat from the hot exhaust gas 22 and produces steam that is usable in, for example, a steam turbine in an electrical generation system.

The turbine includes various internal components that are exposed to elevated temperatures during operation of the turbine assembly 10. Such components include a rotor shaft and rotor disks that rotate about a central axis. Exemplary components also include rotating components 24 such as blades or buckets, which can be removably attached to an outer periphery of each rotor disk. Other components include stationary components 26 such as stator vanes or nozzles.

Figure 2:
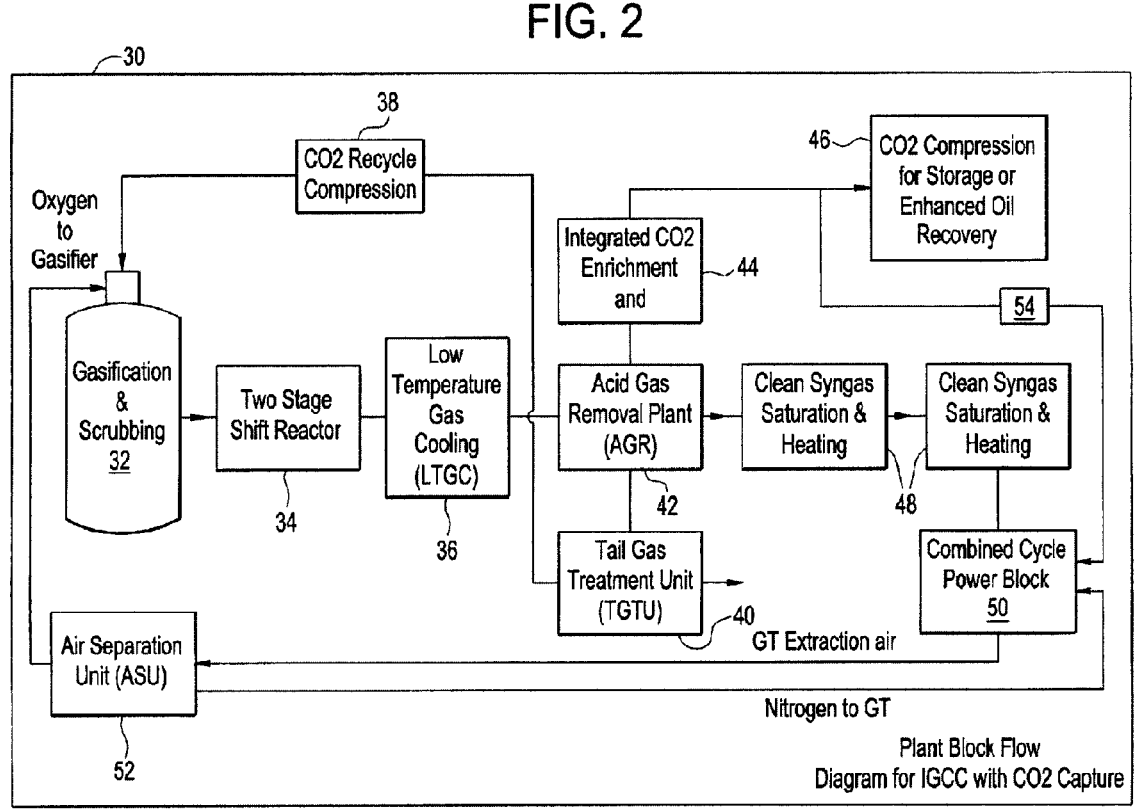
FIG. 2 is a schematic diagram of an exemplary Integrated Gasification Combined Cycle (IGCC) power plant with $CO_2$ capture.

In one example, referring to FIG. 2, an IGCC power generation plant 30 is shown. One or more fuels such as coal or other hydrocarbon fuels, petroleum residues and biomass are fed into a gasification and scrubbing unit 32 in which the fuel undergoes a reduction reaction and synthesis gas ("syngas"), a mixture of primarily carbon monoxide (CO) and hydrogen, is produced. The raw syngas may be cooled via, for example, a radiant syngas cooler and/or a low temperature gas cooling (LTGC) system 36.

In one example, the combustion chamber 18, or other suitable equipment, is utilized in an oxyfuel cycle. Oxyfuel cycles generally include the combustion of fuel with pure oxygen, in place of air. Oxyfuel includes an oxygen enriched gas mixture diluted with combustion gas such as gas turbine exhaust (i.e., a flue gas including mostly of $CO_2$ and $H_2O$).

The gases, in one example, are advanced into a two stage shift reactor 34 in which water vapor is used to convert the CO into carbon dioxide ($CO_2$). At this stage, the syngas is a raw syngas that includes acid gases, which include various contaminants such as $CO_2$ and hydrogen sulfide ($H_2S$). Various other gases also are produced in the gasification process, and present in the syngas, such as nitrogen, carbon monoxide, and others.

An acid gas removal (AGR) plant 42 then receives the raw syngas. The AGR plant 42 processes the raw syngas to remove $H_2S$, which can be sent to a tail gas treatment unit (TGTU) 40, and $CO_2$ from the raw syngas. The AGR plant 42 includes, for example, an absorber in which a solvent absorbs $H_2S$ and $CO_2$ from the raw syngas to produce a "sweetened" or clean syngas. An example of a suitable solvent is Selexol™ (Union Carbide Corporation), although any solvent capable of removing acid gases from a gas mixture may be used. In addition to solvent-based processes, the AGR plant 42 may use any suitable process for sweetening the syngas. Examples of such sweetening processes include selective gas removal processes such as the utilization of $CO_2$ and $H_2S$ selective membranes, warm sulphur removal technologies and others.

In one example, after the syngas is cleaned, the solvent includes concentrations of $H_2S$ and $CO_2$ and may be referred to as a "rich" solvent. The rich solvent is fed into one or more regenerators (including, for example, a stripper and boiler) in which the $H_2S$ and $CO_2$ are stripped from the solvent, resulting in a "lean" solvent. The lean solvent can be recycled for use in subsequent acid gas removal operations.

In one example, the removed $CO_2$ is advanced through an Integrated $CO_2$ Enrichment system 44, and sent to a compression and/or storage unit 46 for $CO_2$ capture and/or enhanced oil recovery. A portion of the $CO_2$, in one example, is diverted via a recycling/compression system 38 and directed back into the gasification unit 32. In addition, the TGTU 40 may be used to remove sulphur from the raw syngas.

The clean syngas is then advanced through various saturation and heating systems 48 and fed into a combined cycle power block 50 for power generation. The power block 50 includes a gas turbine such as the gas turbine assembly 10 and may also include a steam turbine for producing energy from the gas turbine exhaust gases.

In one example, the IGCC plant 30 includes an air separation unit (ASU) 52. Air can be diverted from the gas turbine compressor and fed into the ASU 52. The ASU 52 separates oxygen from the air that can be fed into the gasification unit 32, and also produces nitrogen, which can be diverted back to the turbine for cooling.

In one example, a portion of the $CO_2$ at a suitable pressure is extracted from the $CO_2$ removal system and diverted to the power block 50 to cool the gas turbine stationary or rotating components in a closed loop system wherein the heat picked up by $CO_2$ is recovered. The $CO_2$ is diverted to the gas turbine via any suitable cooling system 54. In one example, the cooling system 54, the combined cycle power block 50 and/or the IGCC power plant 30 includes one or more heat exchangers to regenerate thermal energy from the $CO_2$ that has been heated as a result of applying the $CO_2$ to the gas turbine. The heat exchanges are configured to heat components such as the fuel and/or diluent stream entering the gas turbine, the steam turbine, as well as any other desired fluids such as boiler fluids. After the $CO_2$ is applied to the gas turbine and/or the steam turbine, and any additional components, it may be subsequently sent to the compression and/or storage system 46, where the $CO_2$ is compressed to a selected pressure, such as 2000 psig (~about 140 bars), a typical pressure to supply liquid $CO_2$ for Enhanced Oil Recovery (EOR) applications.

Figure 3:
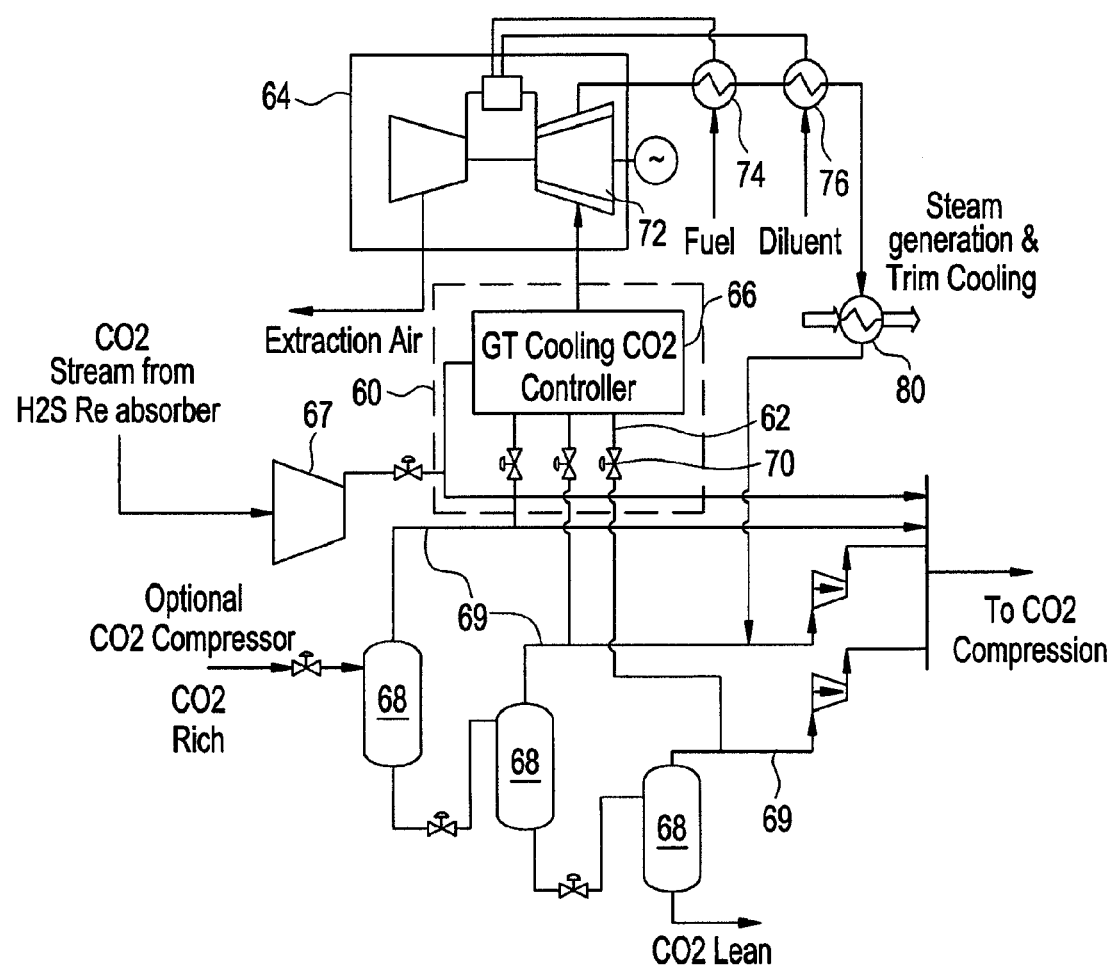
FIG. 3 is a schematic diagram of an exemplary gas turbine cooling system for use in the IGCC power plant of FIG. 2.

Referring to FIG. 3, one example of a cooling system 60 is incorporated into a gas turbine system that utilizes $CO_2$ removal and/or capture. The cooling system 60 includes one or more conduits 62 or other mechanisms for applying $CO_2$ to various components of a gas turbine 64. The cooling system 60 also includes, in one example, a gas turbine cooling $CO_2$ controller 66 that includes processors, memory, transmission devices and/or displays suitable for controlling the operation of the cooling system 60 as well as receiving, processing, displaying and/or transmitting information regarding the cooling system 60.

In one example, the cooling system 60 is in operable communication with the gas turbine 64 and a portion of the AGR plant 42. The AGR plant 42 includes one or more flash tanks 68 that separate $CO_2$ from a rich solvent. Gas conduits 69 are configured to route the separated $CO_2$ from the flash tanks 68 to desired locations, such as the compression and/or storage unit 46. In one example, $CO_2$ fluid from a $H_2S$ reabsorber 67 is routed to the gas turbine cooling $CO_2$ controller 66. The cooling system conduits 62 are in fluid communication with respective gas conduits 69 to divert a portion of the separated $CO_2$ into the cooling system 60. The flow of $CO_2$ into the cooling system can be controlled by the controller 66. In one example, the cooling system 60 includes valves 70 for controlling the flow of $CO_2$ from the gas conduits 69, through the cooling system 60 and into the gas turbine 64. The valves 70 may be selectively operated via, for example, the controller 66.

The cooling system 60, in one example, is a closed loop system. For example, as shown in FIG. 3, $CO_2$ gas is flowed from the cooling system 60 into selected turbine stages, such as a power turbine stage 72, and is directed to selected moving and/or stationary components. The $CO_2$ absorbs heat from the components, and the heated $CO_2$ may be fed through a fuel line heat exchanger 74 and a diluent line heat exchanger 76 to heat fuel and diluent being fed into the combustion chamber 78. The $CO_2$ continues on to at least one additional heat exchanger 80 to heat exhaust gases used in steam generation and trim cooling, before it is returned to one or more of the gas conduits 69 and/or a $CO_2$ storage system.

Figure 4:
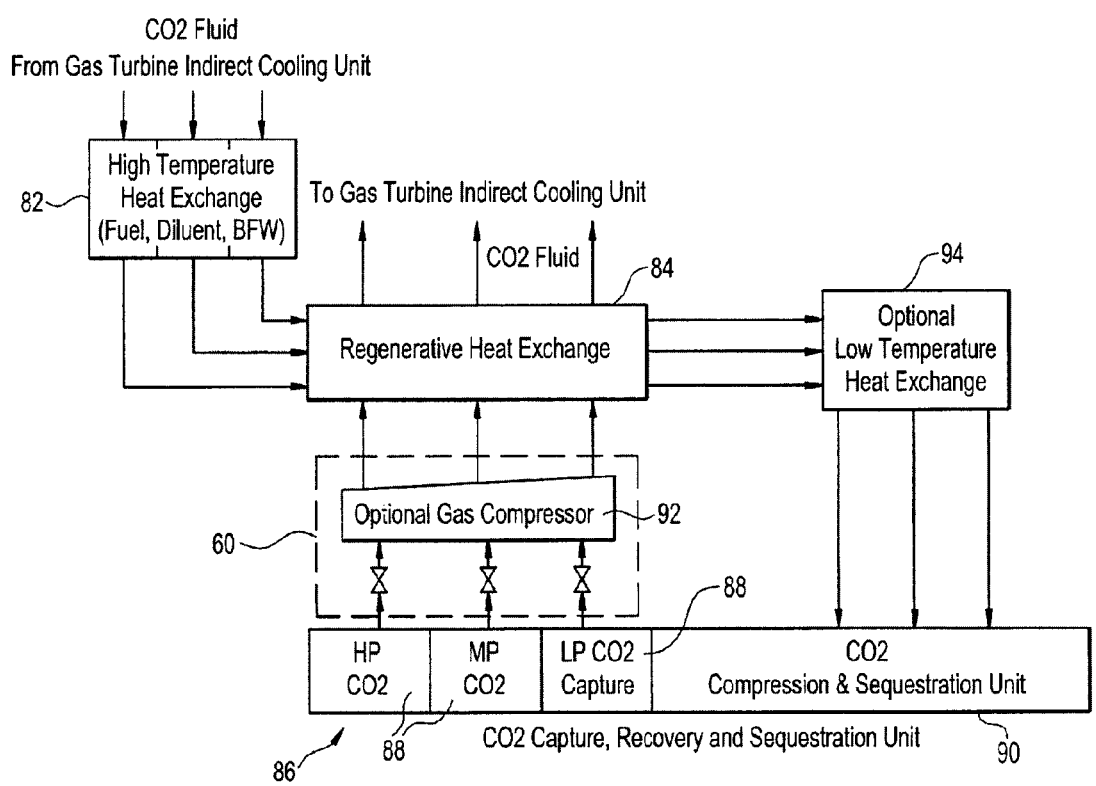
FIG. 4 is a schematic diagram of an exemplary gas turbine cooling system for use in the IGCC power plant of FIG. 2.

Another example of the cooling system 60 is shown in reference to FIG. 4. The cooling system 60 is configured to communicate with an indirect cooling unit (ICU). The ICU defines the closed loop cooling of turbine components. $CO_2$ fluid from the ICU is routed to heat exchangers (e.g., air-fluid heat exchanger, fluid-fuel heat exchanger, heat sinks, regenerative heat exchanger) and it is returned to the $CO_2$ compression and sequestration unit 90.

In this example, $CO_2$ fluid from the ICU is fed to the heat exchangers 82 that are configured to transfer heat from the bleed $CO_2$ to fluids such as the fuel, diluent, compressor discharge air and/or boiler feed water (BFW). Further heat is transferred back to the $CO_2$ which is entering ICU through a regenerative heat exchanger system 84 $CO_2$ fluid can also be cooled through optional low temperature heat exchange systems 94 (e.g., trim coolers, other areas of steam heat exchangers and others) that further cool the $CO_2$ to facilitate compression, liquefaction and/or sequestration. Lastly, the cooled $CO_2$ is diverted to the compression and sequestration unit 90.

In one example, the cooling system 60 is in fluid communication with a $CO_2$ capture, recovery and sequestration system 86. The $CO_2$ capture unit includes a number of capture modules 88. Exemplary capture modules include flash tanks 68 through which the rich solvent is passed. The capture modules 88 can include high pressure (HP), medium pressure (MP) and/or low pressure (LP) modules 88 in fluid communication with a $CO_2$ compression and sequestration unit 90. In use, a portion of the $CO_2$ from the capture modules 88 may be diverted through an optional gas compression system 92 through regenerative heat exchangers 84 to selected ICU of turbine components.

Figure 5:
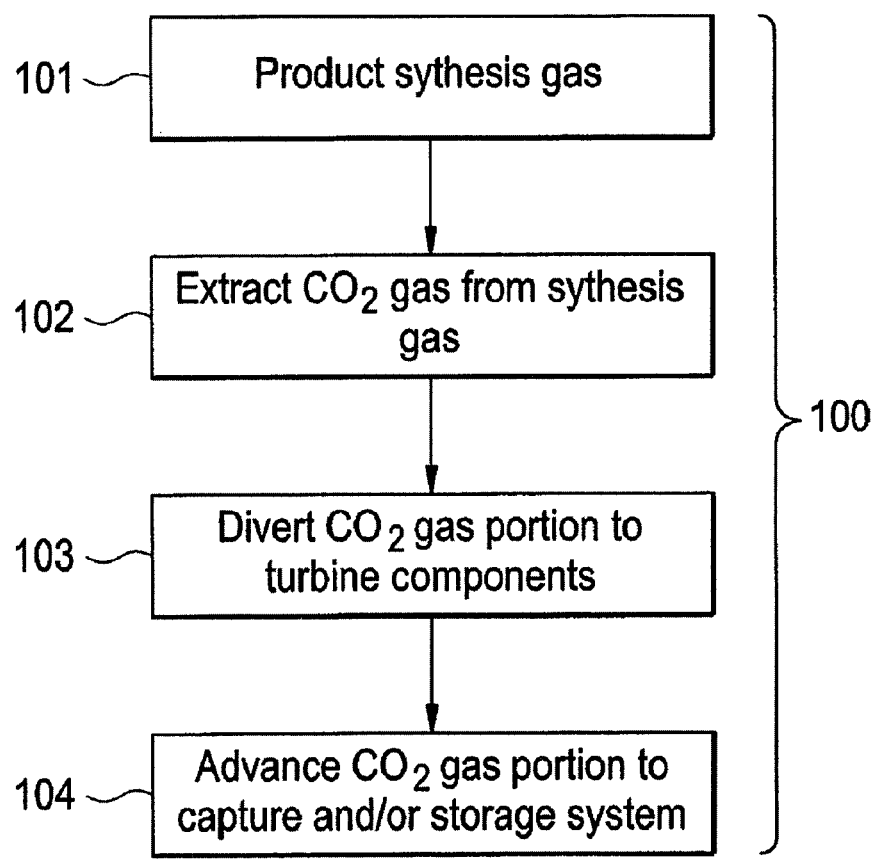
FIG. 5 is flow chart of an exemplary method of cooling a gas turbine.

FIG. 5 illustrates a method 100 of cooling components of a turbine. The method 100 includes one or more stages 101-104. Although the method 100 is described in conjunction with the IGCC power plant 30 and the cooling system 60, the method 100 may be used with any system capable of cooling a turbine assembly as described herein. In one example, the method 100 includes the execution of all of stages 101-104 in the order described or otherwise. However, certain stages may be omitted, stages may be added, or the order of the stages changed.

In the first stage 101, the fuel is flowed into a gasification system such as the gasification and scrubbing unit 32 and raw syngas is produced. The raw syngas is cleaned or sweetened by a suitable cleaning system such as the AGR plant 42 to remove acid gases from the raw syngas.

In the second stage 102, $CO_2$ gas is extracted from the raw syngas and/or from byproducts of cleaning the raw syngas. For example, $CO_2$ gas is removed from a solvent used to clean the raw syngas by the flash tanks 68 or other $CO_2$ extraction mechanisms. The $CO_2$ gas is advanced to a $CO_2$ capture and/or storage system, such as the compression and/or storage unit 46.

In the third stage 103, a portion of the $CO_2$ gas is diverted to a cooling system such as the cooling system 60 that applies the $CO_2$ gas portion to selected components of a turbine such as a gas turbine. Exemplary components include rotating blades or buckets and stationary components such as stator vanes.

In the fourth stage 104, the $CO_2$ gas portion, which has been heated by the turbine components, is recovered in thermal energy, regenerated and then returned to the $CO_2$ capture and/or storage system. In one example, the heated $CO_2$ gas portion is cooled and the thermal energy is transferred to fuel, diluents and/or other components of a power generation system prior to returning the $CO_2$ gas portion to the $CO_2$ capture and/or storage system. In one example, the $CO_2$ gas portion is cooled by transferring thermal energy from the $CO_2$ gas portion to an indirect cooling unit by a suitable heat exchange mechanism such as the regenerative heat exchanger 84.

Figure 6:
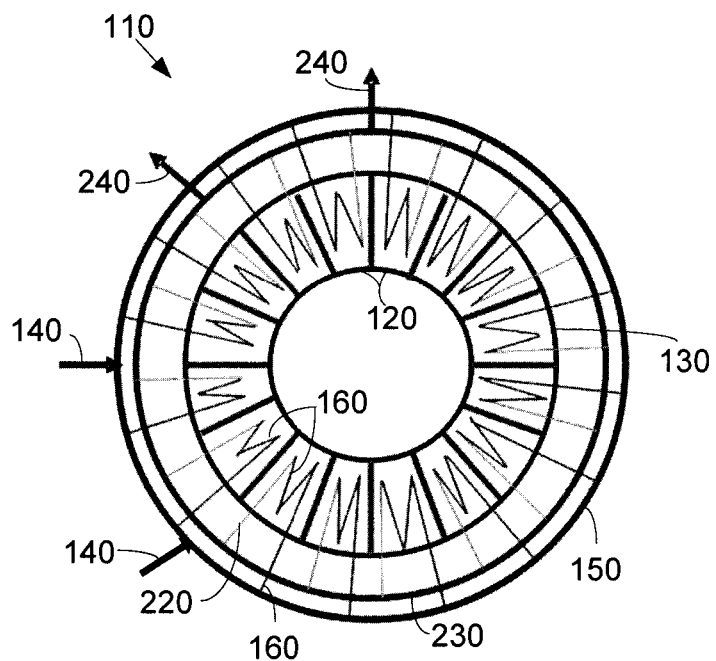
FIG. 6 is a schematic diagram of an example of a stator cooling system as may be described herein.

As described above, the cooling system 60 may flow a portion of the $CO_2$ gas into the power turbine stage 72 so as to cool the moving components and/or the stationary components therein. FIG. 6 shows an example of a stator blade cooling system 110 as may be described herein. Generally described, the power turbine stage 72 includes a number of stationary blades or stator blades 120. The stator blades 120 may be mounted to a casing 130. The stator blades 120 may be circumferentially arranged about the casing 130. Any number of the stator blades 120 may be used herein in any size, shape, or configuration.

The stator blade cooling system 110 may include a stator coolant inlet pipe 140 that may be in communication with the cooling system 60 and the flow of $CO_2$. A number of stator coolant inlet pipes 140 may be used herein. The stator coolant inlet pipes 140 may be in communication with a stator coolant inlet plenum 150. The stator coolant inlet plenum 150 may encircle the casing 130 in whole or in part. The stator coolant inlet plenum 150 may be in communication with some or all of the stator blades 120 via a number of stator blade cooling inflow lines 160. Other components and other configurations may be used herein.

Figure 7:
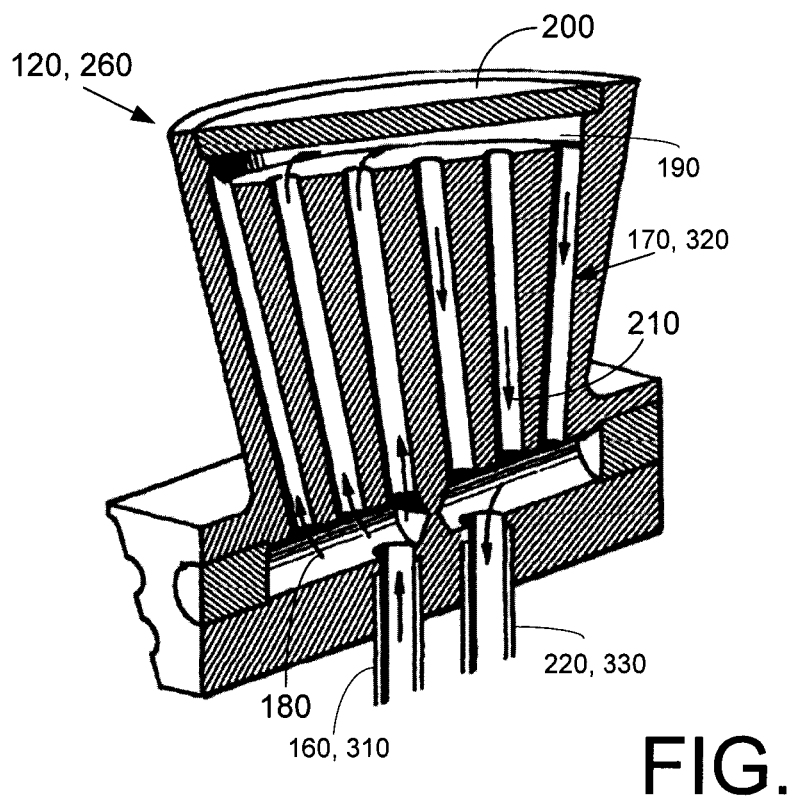
FIG. 7 is side cross-sectional view of a rotor or a stator with an internal cooling plenum.

As is shown in FIG. 7, the stator blade cooling inflow lines 160 may be in communication with an internal stator plenum 170 within some or all of the stator blades 120. The internal stator plenum 170 may include a number of inlet flow channels 180 leading to a cap plenum 190 about a cap 200 thereof and a number of outlet flow channels 210. The internal stator plenum 170 and the channels therein may have any number, size, shape, or configuration.

Referring again to FIG. 6, each internal stator plenum 170 may be in communication with a stator blade cooling outflow line 220. The stator blade cooling outflow lines 220 may, in turn, be in communication with a stator coolant outlet plenum 230. The stator coolant outlet plenum 230 may encircle the casing 130 in whole or in part. The stator cooling outlet plenum 230 may be in communication with a number of stator coolant outlet pipes 240. The stator coolant outlet pipes 240 may be in communication with the heat exchangers 74, 76, 80, the gas conduits 69, the $CO_2$ storage system, and the overall cooling system 60 in the closed loop configuration described above. Other components and other configurations may be used herein.

Figure 8:
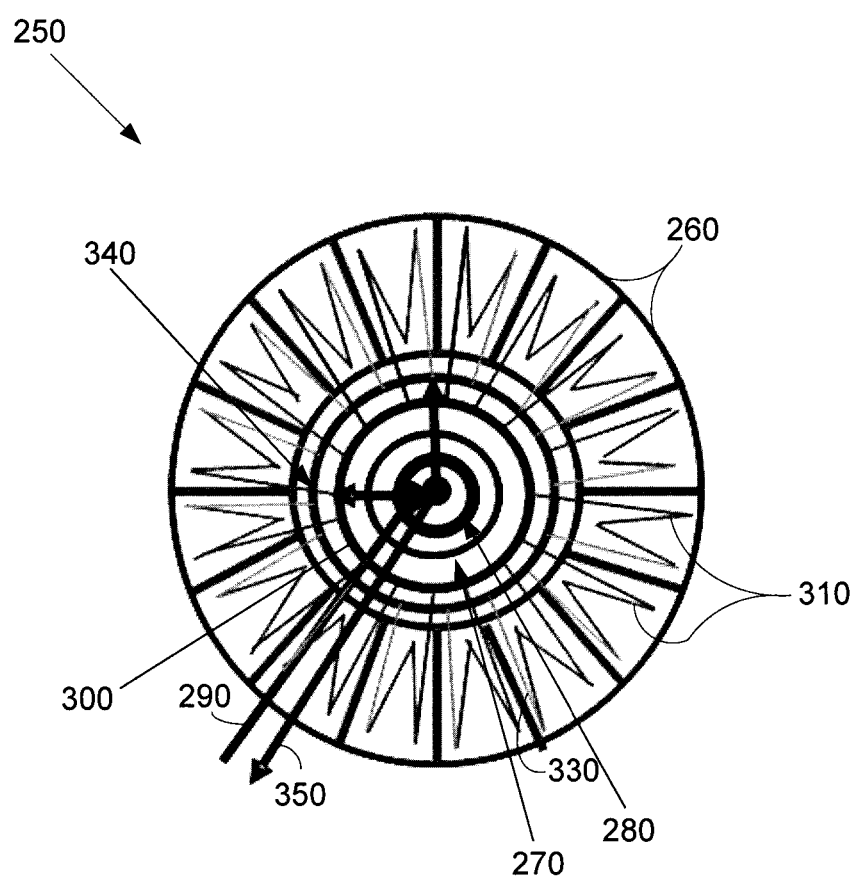
FIG. 8 is a schematic diagram of an example of a rotor cooling system as may be described herein.

FIG. 8 shows an example of a rotor blade cooling system 250 as may be described herein. The power turbine stage 72 also may include a number of rotor blades 260. The rotor blades 260 may be mounted onto a rotor disk 270. The rotor blades 260 may be circumferentially arranged about the rotor disk 270 for rotation therewith. Likewise, the rotor disk 270 may be attached to a rotor shaft 280 for rotation therewith. Any number of the rotor blades 260 may be used herein in any size, shape, or configuration. Other components and other configurations may be used herein.

The rotor blade cooling system 250 may include a rotor coolant inlet pipe 290. The rotor coolant inlet pipe 290 may be in communication with the cooling system 60 and the flow of $CO_2$. The rotor coolant inlet pipe 290 may extend axially through the rotor disk 270 of the rotor shaft 280 and then radially to a rotor coolant inlet plenum 300. The rotor coolant inlet plenum 300 may encircle the rotor disk 270 in whole or in part. Other components and other configurations may be used herein.

The rotor coolant inlet plenum 300 may be in communication with some or all of the rotor blades 260 via a number of rotor blade cooling inflow lines 310. Referring again to FIG. 7, the rotor blade cooling inflow lines 310 may be in communication with an internal rotor plenum 320 within some or all of the rotor blades 260. The internal rotor plenum 320 may include the number of inlet flow channels 180 leading to the cap plenum 190 about the cap 200 thereof and the number of outlet flow channels 210. The internal rotor plenum 320 and the channels therein may have any number, size, shape, or configuration.

Referring again to FIG. 8, each internal rotor plenum 330 may be in communication with a rotor blade cooling outflow line 330. The rotor blade cooling outflow lines 330 may, in turn, be in communication with a rotor coolant outlet plenum 340. The rotor coolant outlet plenum 340 may encircle the rotor disk 270 in whole or in part. The rotor coolant flow outlet plenum 340 may be in communication with a rotor coolant outlet pipe 350. The rotor coolant outlet pipe 350 may extend axially through the rotor disk 270 and/or the rotor shaft 280. The rotor coolant outlet pipe 350 likewise may be in communication with the heat exchangers 74, 76, 78, the one or more gas conduits 69, the $CO_2$ storage system, and the overall cooling system 60 in the close loop configuration described above.

The cooling system 60 thus may be in communication with the stator blade cooling system 110 and the rotor blade cooling system 250 so as to adequately cool the stator blades 120 and the rotor blades 260 in a first closed loop configuration and a second closed loop configuration. The heat generated by the turbine components and the thermal energy therein may be transferred to fuel, diluents, and/or other components of the overall system before returning the $CO_2$ flow. The stator blade cooling system 110 and the rotor blade cooling system 250 thus cool the components herein with the flow of $CO_2$ instead of a parasitic flow of air from the compressor or elsewhere.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A cooling system for a gas turbine, comprising:
a source of $CO_2$;
a stator blade cooling system positioned about a casing of the gas turbine and in communication with the source of $CO_2$ and a plurality of stator blades; and
a rotor blade cooling system positioned about a rotor shaft of the gas turbine and in communication with the source of $CO_2$ and a plurality of rotor blades;
wherein a first portion of a flow of $CO_2$ flows through the stator blade cooling system and returns to the source of $CO_2$ in a first closed loop and wherein a second portion of the flow of $CO_2$ flows through the rotor blade cooling system and returns to the source of $CO_2$ in a second closed loop.

2. The cooling system of claim 1, wherein the stator blade cooling system comprises a plurality of stator blades with an internal stator plenum therein.

3. The cooling system of claim 2, wherein the stator blade cooling system comprises a stator coolant inlet plenum in communication with the source of $CO_2$ and the plurality of stator blades.

4. The cooling system of claim 2, wherein the internal stator plenum comprises a plurality of inlet flow channels leading to a cap plenum and a plurality of outlet flow channels.

5. The cooling system of claim 2, wherein the stator blade cooling system comprises a stator coolant outlet plenum in communication with the plurality of stator blades and the source of $CO_2$.

6. The cooling system of claim 2, wherein the stator blade cooling system comprises a stator blade cooling inflow line and a stator blade cooling outflow line in communication with the plurality of stator blades.

7. The cooling system of claim 1, wherein the first closed loop comprises a heat exchanger, a gas conduit, and/or a $CO_2$ storage system.

8. The cooling system of claim 1, wherein the rotor blade cooling system comprises a plurality of rotor blades with an internal rotor plenum therein.

9. The cooling system of claim 8, wherein the rotor blade cooling system comprises a rotor coolant inlet plenum in communication with the source of $CO_2$ and the plurality of rotor blades.

10. The cooling system of claim 8, wherein the internal rotor plenum comprises a plurality of inlet flow channels leading to a cap plenum and a plurality of outlet flow channels.

11. The cooling system of claim 8, wherein the rotor blade cooling system comprises a rotor coolant outlet plenum in communication with the plurality of rotor blades and the source of $CO_2$.

12. The cooling system of claim 8, wherein the rotor blade cooling system comprises a rotor blade cooling inflow line and a rotor blade cooling outflow line in communication with the plurality of rotor blades.

13. The cooling system of claim 1, wherein the second closed loop comprises a heat exchanger, a gas conduit, and/or a $CO_2$ storage system.

14. The cooling system of claim 1, wherein the rotor bade cooling system extends axially through the rotor shaft.

15. A cooling system for a gas turbine, comprising:
a source of $CO_2$;
a stator blade cooling system positioned about a casing of the gas turbine and in communication with the source of $CO_2$ and a plurality of stator blades;
wherein the plurality of stator blades comprises an internal stator plenum; and
a rotor blade cooling system positioned axially through a rotor shaft of the gas turbine and in communication with the source of $CO_2$ and a plurality of rotor blades;
wherein the plurality of rotor blades comprises an internal rotor plenum;
wherein a first portion of a flow of $CO_2$ flows through the stator blade cooling system and returns to the source of $CO_2$ in a first closed loop and wherein a second portion of the flow of $CO_2$ flows through the rotor blade cooling system and returns to the source of $CO_2$ in a second closed loop.

16. The cooling system of claim 15, wherein the stator blade cooling system comprises a stator coolant inlet plenum in communication with the source of $CO_2$ and the plurality of stator blades.

17. The cooling system of claim 15, wherein the first closed loop comprises a heat exchanger, a gas conduit, and/or a $CO_2$ storage system.

18. The cooling system of claim 15, wherein the rotor blade cooling system comprises a rotor coolant inlet plenum in communication with the source of $CO_2$ and the plurality of rotor blades.

19. The cooling system of claim 15, wherein the second closed loop comprises a heat exchanger, a gas conduit, and/or a $CO_2$ storage system.

* * * * *